(12) United States Patent
Bull

(10) Patent No.: US 9,900,848 B2
(45) Date of Patent: *Feb. 20, 2018

(54) WIRELESS COMMUNICATION WITH INTERFERENCE MITIGATION

(71) Applicant: IRIDIUM SATELLITE LLC, McLean, VA (US)

(72) Inventor: Jeffrey Francis Bull, Chalfont, PA (US)

(73) Assignee: IRIDIUM SATELLITE LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/594,833

(22) Filed: May 15, 2017

(65) Prior Publication Data

US 2017/0251437 A1    Aug. 31, 2017

Related U.S. Application Data

(63) Continuation of application No. 14/984,553, filed on Dec. 30, 2015, now Pat. No. 9,667,335, which is a
(Continued)

(51) Int. Cl.
*H04L 5/14* (2006.01)
*H04B 7/185* (2006.01)
(Continued)

(52) U.S. Cl.
CPC .......... *H04W 52/243* (2013.01); *H04B 1/126* (2013.01); *H04B 1/44* (2013.01);
(Continued)

(58) Field of Classification Search
CPC .... H04B 7/18519; H01Q 3/26; H04W 52/243
See application file for complete search history.

(56) References Cited

U.S. PATENT DOCUMENTS 9,252,868 B1 * 2/2016 Bull .................... H04B 7/18519
9,667,335 B2 * 5/2017 Bull .................... H04B 7/18519
(Continued)

OTHER PUBLICATIONS

Andrew H. Zai, "The Steered Auxiliary Beam Canceller for Interference Cancellation in a Phased Array", Jul. 21, 2011, Falls Church, VA.
(Continued)

*Primary Examiner* — Bobbak Safaipour
(74) *Attorney, Agent, or Firm* — Baker Botts L.L.P.

(57) ABSTRACT

In one implementation, a wireless communication terminal includes a primary antenna array and a first controller configured to steer a main beam of the primary antenna array in a desired direction. The wireless communication terminal also includes an auxiliary antenna array and a second controller configured to control complex weights to be applied by at least some antenna elements of the auxiliary antenna array to corresponding variants of a second signal received by the at least some auxiliary antenna elements. Furthermore, the wireless communication terminal includes at least one signal combiner configured to combine variants of the second signal received from auxiliary antenna elements into an interfering signal that models interference from a co-located wireless communication terminal and subtract the interfering signal from variants of the first signal received from antenna elements of the principal antenna array to produce an interference mitigated signal.

20 Claims, 3 Drawing Sheets

Related U.S. Application Data continuation of application No. 14/484,895, filed on Sep. 12, 2014, now Pat. No. 9,252,868.

(51) Int. Cl.
*H04W 52/24* (2009.01)
*H01Q 3/26* (2006.01)
*H04W 16/28* (2009.01)
*H04W 52/52* (2009.01)
*H04B 1/44* (2006.01)
*H04B 1/12* (2006.01)

(52) U.S. Cl.
CPC ........ *H04B 7/18517* (2013.01); *H04W 16/28* (2013.01); *H04W 52/52* (2013.01)

(56) References Cited

U.S. PATENT DOCUMENTS

2005/0157776 A1* 7/2005 Ryu ................ H04B 1/707
 375/148
2008/0292032 A1* 11/2008 Belogolovy ........ H04L 27/2614
 375/346
2014/0313946 A1* 10/2014 Azadet ................ G06F 17/5009
 370/278

OTHER PUBLICATIONS

"Beamforming—Wikipedia, the free encyclopedia", http://en.wikipedia.org/wiki/Beam_forming (last visited Jul. 10, 2014).
"Main lobe—Wikipedia, the free encyclopedia", http://en.wikipedia.org/wiki/Main_lobe (last visited Jul. 15, 2014).
"Phased array—Wikipedia, the free encyclopedia", http://en.wikipedia.org/wiki/Phased_array (last visited Jul. 9, 2014).
"Side lobe—Wikipedia, the free encyclopedia", http://en.wikipedia.org/wiki/Side_lobe (last visited Jul. 15, 2014).
Y. T. Jade Morton, "Interference Cancellation Using Power Minimization and Self-coherence Properties of GPS Signals", Sep. 21, 2004, Long Beach, CA.

* cited by examiner

WIRELESS COMMUNICATION WITH INTERFERENCE MITIGATION

RELATED APPLICATIONS

This application is a continuation under 35 U.S.C. § 120 of U.S. patent application Ser. No. 14/984,553 filed Dec. 30, 2015, which is a continuation under 35 U.S.C. § 120 of U.S. patent application Ser. No. 14/484,895 filed Sep. 12, 2014, now U.S. Pat. No. 9,252,868 B1 issued Feb. 2, 2016, the contents of each of which are incorporated herein by reference in their entirety.

TECHNICAL FIELD

The disclosure relates generally to wireless communication, and more specifically to wireless communication with interference mitigation.

SUMMARY

According to one implementation of the disclosure, a wireless communication terminal includes a primary antenna array and a first controller configured to steer a main beam of the primary antenna array in a desired direction. The wireless communication terminal also includes an auxiliary antenna array and a second controller configured to control complex weights to be applied by at least some antenna elements of the auxiliary antenna array to corresponding variants of a second signal received by the at least some auxiliary antenna elements. Furthermore, the wireless communication terminal includes at least one signal combiner configured to combine variants of the second signal received from auxiliary antenna elements into an interfering signal that models interference from a co-located wireless communication terminal and subtract the interfering signal from variants of the first signal received from antenna elements of the principal antenna array to produce an interference mitigated signal.

According to another implementation of the disclosure, a main signal is received with a primary antenna array. The main signal includes noise from a proximally located wireless communication terminal received in one or more side lobes of the primary antenna array. Variants of a secondary signal are received with corresponding antenna elements of an auxiliary antenna array. Complex weights to be applied by individual antenna elements of the auxiliary antenna array to the corresponding variants of the secondary signal received by the individual antenna elements are set based on a direction of a main beam of the primary antenna array. The complex weights are applied to the corresponding variants of the secondary signal received by the individual antenna elements to shift (e.g., in amplitude and/or phase) the variants of the secondary signal received by the individual antenna elements. The shifted variants of the secondary signal then are combined into an interfering signal to model the noise from the proximally located wireless communication terminal received in the one or more side lobes of the primary antenna array and the interfering signal is subtracted from the main signal to produce an interference mitigated signal.

In yet another implementation of the disclosure, a satellite communication terminal includes a primary antenna array, an auxiliary antenna array, first and second controllers, and at least one signal combiner. The primary antenna array includes a first number of primary antenna elements. Individual ones of the primary antenna elements are configured to receive variants of a first signal. Similarly, the auxiliary antenna array includes a second number of auxiliary antenna elements and individual ones of the auxiliary antenna elements are configured to receive variants of a second signal. The first controller is configured to steer a main beam of the primary antenna array in a desired direction to receive a desired signal from a satellite orbiting the earth. The second controller is configured to control complex weights to be applied by at least some of the auxiliary antenna elements to the corresponding variants of the second signal received by the at least some auxiliary antenna elements. The at least one signal combiner is configured to combine variants of the second signal received from auxiliary antenna elements into an interfering signal that models a signal transmitted by a co-located satellite communication terminal received in one or more side lobes of the satellite communication terminal and subtract the interfering signal from variants of the first signal received from principal antenna elements to produce an interference mitigated version of the desired signal.

Other features of the present disclosure will be apparent in view of the following detailed description of the disclosure and the accompanying drawings. Implementations described herein, including the above-described implementations, may include a method or process, a system, or computer-readable program code embodied on computer-readable media.

BRIEF DESCRIPTION OF THE DRAWINGS

For a more complete understanding of the present disclosure, reference now is made to the following description taken in connection with the accompanying drawings.

DETAILED DESCRIPTION

Figure 1:
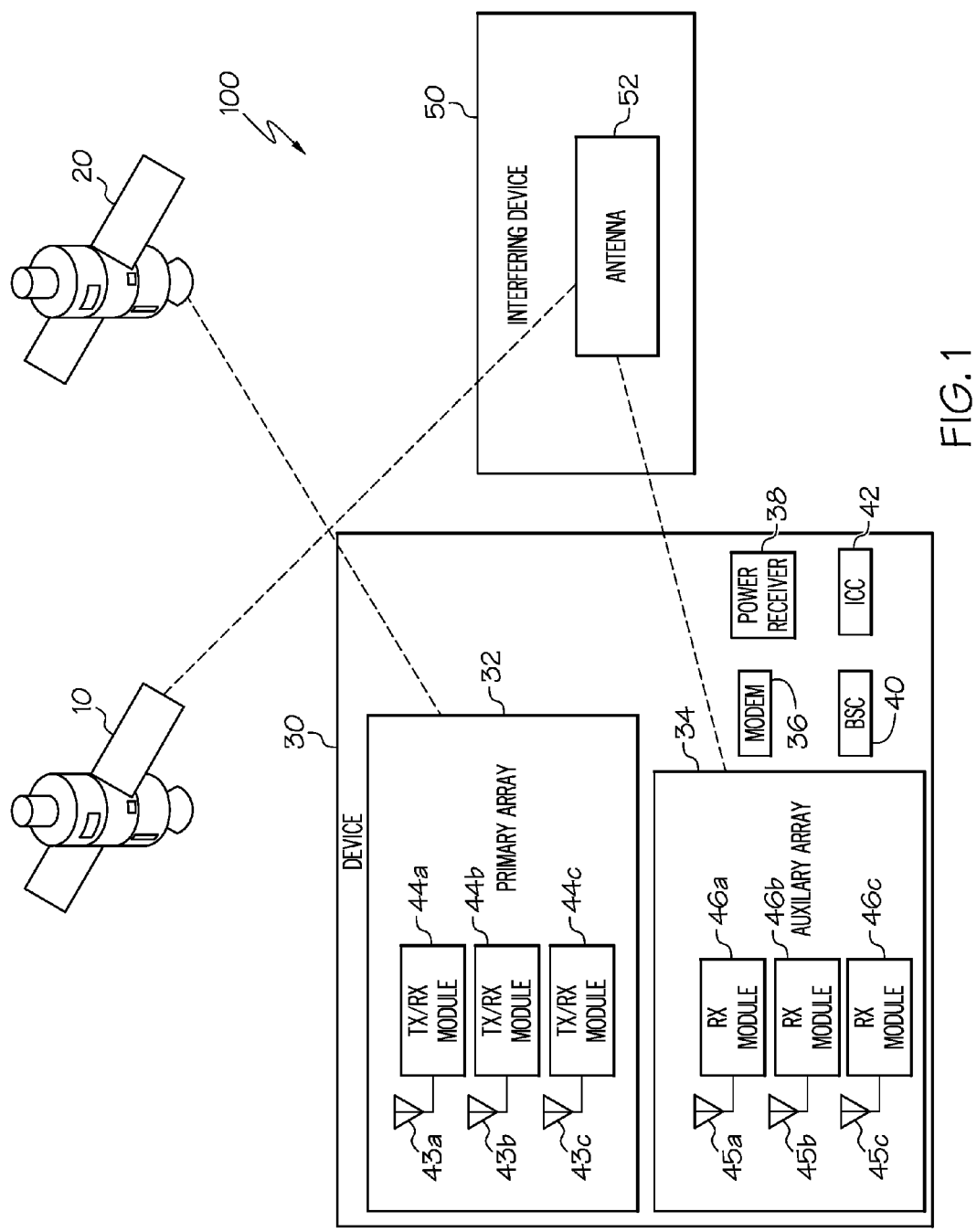
FIG. 1 is a high level block diagram of a system for wireless communication with interference mitigation in accordance with a non-limiting implementation of the present disclosure.

Satellite communication systems may enable wireless voice and data communications around the world. In some cases, satellite communication systems enable communication in regions where other wireless communication systems may not be available. For example, some wireless communication systems may require terrestrial infrastructure (e.g., a cell tower, a base station, etc.). It may not be possible to communicate using these systems in regions where the necessary terrestrial infrastructure does not exist or cannot be accessed. However, satellite communication systems still may be capable of communicating in such regions. Examples of these regions include the oceans, the airways, the polar regions, and developing and/or underdeveloped nations. Frequently, multiple satellite communication systems may be co-located (e.g., within a fixed relative area). For example, a ship equipped with two or more satellite communication systems may have only a small deck area suitable for installing the antennae for the satellite communication systems and, consequently, the antennae for the satellite communication systems may be forced to be installed in close physical proximity to one another (e.g., within a few feet or yards of one another on the deck).

Similarly, an aircraft equipped with two or more satellite communication systems may have limited external area suitable for mounting the antennae for the satellite communications systems. As a result, the antennae for the satellite communication systems may be mounted in close physical proximity to one another.

In some cases, two or more co-located satellite communication systems may use similar, adjacent, neighboring, and/or overlapping frequencies (e.g., for transmit and/or receive functions of satellite communication). As a result, an output signal transmitted by a first satellite communication system may interfere with the ability of a second, co-located satellite communication system to receive an input signal, and vice versa, particularly if the power of the output signal is significantly greater than the power of the input signal. For example, if the first satellite communication system transmits a relatively high-power output signal in a frequency band that is immediately adjacent to the frequency band in which the second satellite communication system receives a relatively low-power input signal, components of the relatively high-power output signal may spill over into the frequency band in which the second satellite communication system receives the low-power input signal and, particularly due to the power difference between the two signals, cause interference with the relatively low-power input signal, thereby degrading the performance of the second satellite communication system. Additionally or alternatively, the presence of the relatively high-power output signal may cause reciprocal mixing in the receiver of the second satellite communication system also resulting in degradation of the second satellite communication system's ability to receive the relatively low-power input signal. Local oscillators with relatively good phase-noise performance may be employed to mitigate the effect of such reciprocal mixing, but such high performance oscillators may be relatively expensive. Application of the interference mitigation techniques described herein may enable the use of potentially cheaper local oscillators with worse phase-noise performance while still providing protection against reciprocal mixing.

In one specific example, an IRIDIUM® satellite terminal that uses L band frequencies between 1616 and 1626.5 megahertz ("MHz") to communicate with IRIDIUM® satellites may be co-located (e.g., on a ship or aircraft) with an INMARSAT® satellite terminal that uses L band frequencies between 1525 and 1646.5 MHz to communicate with one or more INMARSAT® satellites. Consequently, transmissions to/from the INMARSAT® satellite terminal may pose the potential for interference with transmissions to/from the IRIDIUM® satellite terminal and vice versa. For example, the INMARSAT® satellite terminal may transmit communications in a frequency band that is adjacent to a frequency band in which the IRIDIUM® satellite terminal receives transmissions from IRIDIUM® satellites. Accordingly, outbound transmissions from the INMARSAT® satellite terminal may pose the potential to interfere with transmissions received by the IRIDIUM® satellite terminal and/or cause reciprocal mixing in the IRIDIUM® satellite terminal resulting in signal degradation, particularly given the relatively high power of output transmissions from the INMARSAT® satellite terminal required to reach an INMARSAT® satellite and the relatively low power of transmissions received by the IRIDIUM® satellite terminal from an IRIDIUM® satellite. For example, the power ratio of transmissions output by the INMARSAT® satellite terminal to transmissions received by the IRIDIUM® satellite terminal may be on the order of +100 dB or more.

A satellite communication terminal may be configured to mitigate the effects of interference from one or more other satellite communication terminals in the event that the satellite communication terminal is co-located with one or more other satellite communications terminals, for example that use similar, adjacent, neighboring, and/or overlapping frequencies. For instance, a satellite communication terminal configured to receive a signal from one or more satellites even when co-located with another satellite communication terminal that transmits an output signal in a similar, adjacent, neighboring, and/or overlapping frequency band may employ beam steering (e.g., using complex weights, phase shifters, etc.) to steer the main beam of the satellite communication terminal's antenna toward the signal to be received (and, in some cases) away from the interfering signal output by the co-located satellite communication terminal. However, in some cases (e.g., if the power of the interfering signal is significantly greater than the power of the signal to be received), such beam steering alone may not effectively mitigate the interference caused by the signal transmitted by the co-located satellite communication terminal.

Additionally or alternatively, the satellite communication terminal may employ frequency domain filtering techniques (e.g., band pass filtering, for instance, using a surface acoustic wave ("SAW") filter) to mitigate interference caused by the signal transmitted by the co-located satellite communication terminal. However, in some cases (e.g., if the interfering signal is in a similar, adjacent, neighboring, and/or overlapping frequency band and particularly if the power of the interfering signal is significantly greater than the power of the signal to be received), such frequency domain filtering techniques alone may not effectively mitigate the interference caused by the signal transmitted by the co-located satellite communication terminal.

As described herein, implementations of the present disclosure may provide a satellite communication system configured to mitigate the effects of interference from one or more other co-located satellite communication systems. For example, implementations of the present disclosure may utilize a combination of a main antenna or antenna array and an auxiliary antenna or antenna array to receive an interfering signal from a co-located satellite communication system and subtract the interfering signal from the signal received by the main antenna to mitigate the interference caused by the interfering signal to the desired signal. In certain implementations, spatial filtering techniques (e.g., shaping an antenna's transmit/receive response) may be employed to mitigate interference caused by the co-located satellite communication system. For example, the primary antenna may be a steerable antenna (e.g., a switched beam antenna or an adaptive array antenna) configured to steer a beam (e.g., a main beam) of the primary antenna in a direction perceived as advantageous for receiving the desired satellite signal and the auxiliary antenna may be configured to receive the interfering signal from the co-located satellite communication system such that the interfering signal received by the auxiliary antenna can be subtracted from the signal received by the primary antenna to mitigate the effects of the interfering signal received by the primary antenna.

In certain implementations, the gain of the auxiliary antenna may be relatively low compared to the gain of the primary antenna. Furthermore, complex weights may be applied to the signal received by the auxiliary antenna to shift the amplitude and/or phase of the signal received by the auxiliary antenna in an effort to optimize the cancellation of the interfering signal from the co-located satellite communication system.

With reference to FIG. 1, a high level block diagram of a system 100 for wireless communication is illustrated in accordance with a non-limiting implementation of the present disclosure. System 100 includes satellites 10 and 20, wireless communication terminal 30 for receiving a signal from satellite 20, and interfering wireless communication terminal 50 for transmitting a signal to satellite 10. Wireless communication terminal 30 includes a primary antenna array 32, an auxiliary antenna array 34, a modem 36, a power receiver 38, a Beam Steering Controller ("BSC") 40, and an Interference Canceller Controller ("ICC") 42. Primary array 32 has one or more antenna elements 43a-c, each of which includes a corresponding transmit/receive module 44a-c. Auxiliary array 34 has one or more antenna elements 45a-c, each of which includes a corresponding receive module 46a-c. For example, primary antenna array 32 may have 12 antenna elements, and auxiliary antenna array 34 may have 3 antenna elements. Primary array 34 may transmit and/or receive signals to satellite 20.

Interfering wireless communication terminal 50 includes one or more antenna elements 52. Antenna elements 52 communicate with satellite 10. When interfering wireless communication terminal 50 is transmitting to satellite 10, antenna 52 may send a relatively high power transmission signal (particularly when compared to the power of the signal that wireless communication terminal 30 receives from satellite 20) from interfering wireless communication terminal 50 to satellite 10. The relatively high power transmission signal sent by interfering wireless communication terminal 50 may be in a similar, adjacent, neighboring and/or overlapping frequency band to a frequency band in which wireless communication terminal 30 is configured to receive signals from satellite 20. Furthermore, wireless communication terminal 30 may be located in close proximity (e.g., less than 5 feet, between 5 and 15 feet, between 15-50 feet, etc.) to interfering wireless communication terminal 50. Thus, the relatively high power transmission signal sent by interfering wireless communication terminal 50 may interfere with the ability of wireless communication terminal 30 to receive the relatively low power signal from satellite 20.

The BSC 40 may be configured to steer a main beam of primary antenna array 32 in a desired direction to facilitate the transmission of signals to and/or the reception of signals from satellite 20. For example, BSC 40 may control complex weights applied by transmit/receive modules 44a-44c to signals transmitted/received by antenna elements 43a-43c to steer a main beam of primary antenna array 32 in the desired direction. However, even with a main beam of primary antenna array 32 positioned to facilitate the reception of the signal from satellite 20, the signal transmitted by interfering wireless communication terminal 50 still may interfere with the ability of wireless communication terminal 30 to receive the signal from satellite 20. For example, even if a main beam of primary antenna array 32 is steered in the direction of satellite 20 (and/or away from interfering wireless communication terminal 50), the signal transmitted by interfering wireless communication terminal 50 still may be received in the side lobe(s) of primary antenna array 32.

Therefore, auxiliary antenna array 34 may be used to sample the signal transmitted by interfering wireless communication terminal 50 so that the sampled interfering signal may be subtracted from the signal received by primary antenna array 32 to produce an interference mitigated signal that thereafter is provided to modem 36. In certain implementations, a main beam of auxiliary antenna array 34 may be steered in a particular direction to facilitate reception of the interfering signal from interfering wireless communication terminal 50. In certain implementations, power receiver 38 may measure the power in the interference mitigated signal, and ICC 42 may control complex weights applied by receive modules 46a-46c to the signals received by antenna elements 45a-45c in an effort to minimize the power in the interference mitigated signal. Furthermore, in certain implementations, the above-described signal processing may be performed at radio frequencies ("RF") (e.g., before the received signal is converted to an intermediate frequency, baseband, etc.).

Figure 2:
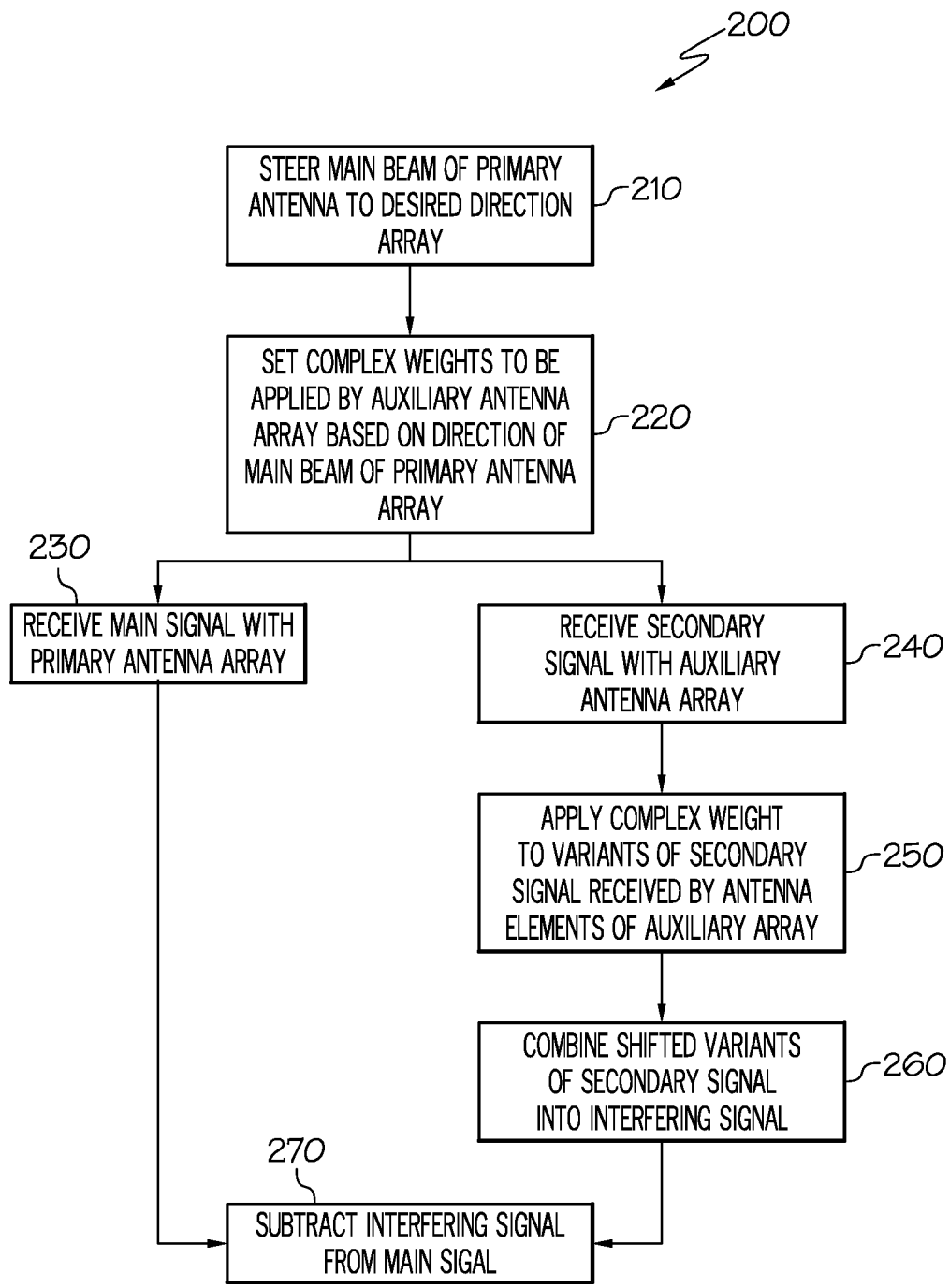
FIG. 2 is a flow chart of a method for wireless communication with interference mitigation in accordance with a non-limiting implementation of the present disclosure.

With reference to FIG. 2, a flow chart 200 of a method for wireless communication with interference mitigation is illustrated in accordance with a non-limiting implementation of the present disclosure. The method illustrated in flow chart 200 may be performed by the wireless communication terminal 30 illustrated in FIG. 1. At step 210, a main beam of a primary antenna array is steered to a desired direction. For example, a desired signal to be received may be transmitted by a satellite orbiting the earth, and a main beam of the primary antenna array may be steered in a direction favorable for receiving the desired signal. In some implementations, a main beam of the antenna array may be steered in the desired direction by defining complex weights to be applied to the signals received by the antenna elements of the primary antenna array. At step 220, complex weights to be applied by the auxiliary antenna array are set based on the direction of the main beam of the primary antenna array. As described in greater detail below, in some implementations, the complex weights to be applied may be calculated substantially in real-time as the main beam of the primary antenna is steered, while, in other implementations, the complex weights to be applied may have been predetermined (e.g., during a calibration process) for each of a number of different possible directions in which the main beam of the primary antenna may be steered.

At step 230, a main signal is received by the primary antenna array. The main signal may include noise from a signal transmitted by another nearby wireless communication terminal. For example, the signal transmitted by the nearby wireless communication terminal may be received in one or more side lobes of the primary antenna array. In some cases, the power of the signal transmitted by the nearby wireless communication terminal may be significantly greater than the power of the signal desired to be received (e.g. +100 dB).

In parallel with receiving the main signal, at step 240, a secondary signal is received with the auxiliary antenna array. The secondary signal received by the auxiliary antenna array may include the signal transmitted by the nearby wireless communication terminal. As such, the auxiliary antenna array may be said to sample the signal transmitted by the nearby wireless communication terminal. In some implementations, the individual antenna elements of the auxiliary antenna array may receive variants (e.g., time- and/or phase-shifted variants) of the second signal. At step 250, the antenna elements of the auxiliary antenna array apply the previously set complex weights to the variants of the secondary signal they received, thereby generating shifted (e.g. phase-shifted) variants of the secondary signal. At step 260, the shifted variants of the secondary signal are combined into an interfering signal (e.g., that models the signal transmitted by the nearby wireless communication terminal).

At step 270, the interfering signal is subtracted from the main signal. Subtracting the interfering signal from the main signal may result in noise (e.g., the signal transmitted by the nearby wireless communication terminal) being canceled or reduced from the main signal to enable further processing of a desired signal included within the main signal. The resulting signal, therefore, may be referred to as an interference mitigated signal.

In some implementations, the power in the interference mitigated signal may be monitored, and the weights to be applied by the antenna elements of the auxiliary antenna array may be calculated to minimize (or at least reduce) the power in the interference mitigated signal. For example, in some particular implementations, a calibration process may be performed upon installation of the device and/or at intervals thereafter to determine appropriate complex weights to be applied by the antenna elements of the auxiliary antenna array to minimize (or at least reduce) the power in the interference mitigated signal for each of a defined number of possible directions in which a main beam of the primary antenna array may be steered. Additionally or alternatively, the power in the interference signal may be measured continually and used as feedback to continually adapt the complex weights applied by the antenna elements of the auxiliary antenna array substantially in real-time.

In some implementations, the desired signal may be transmitted by satellites within a constellation of two or more satellites orbiting the earth. Therefore, the direction of a main beam of the primary antenna array may be changed relatively frequently to account for changes in the position of a particular satellite from which the desired signal is being received as the particular satellite orbits the earth. As the beam of the primary antenna array is steered in this manner, occasionally the main beam of the primary antenna array may be pointed substantially in the direction of the signal being transmitted by the nearby wireless communication terminal. When this occurs, the noise in the main signal caused by the nearby wireless communication terminal may make it difficult or impossible to extract the desired signal from the main signal. Therefore, when it is determined that pointing the main beam of the primary antenna array may subject the primary antenna array to substantial interference from a nearby wireless communication terminal, the main beam of the primary antenna array may be steered in a different direction that is favorable for receiving the desired signal from another one of the satellites in the satellite constellation.

Figure 3:
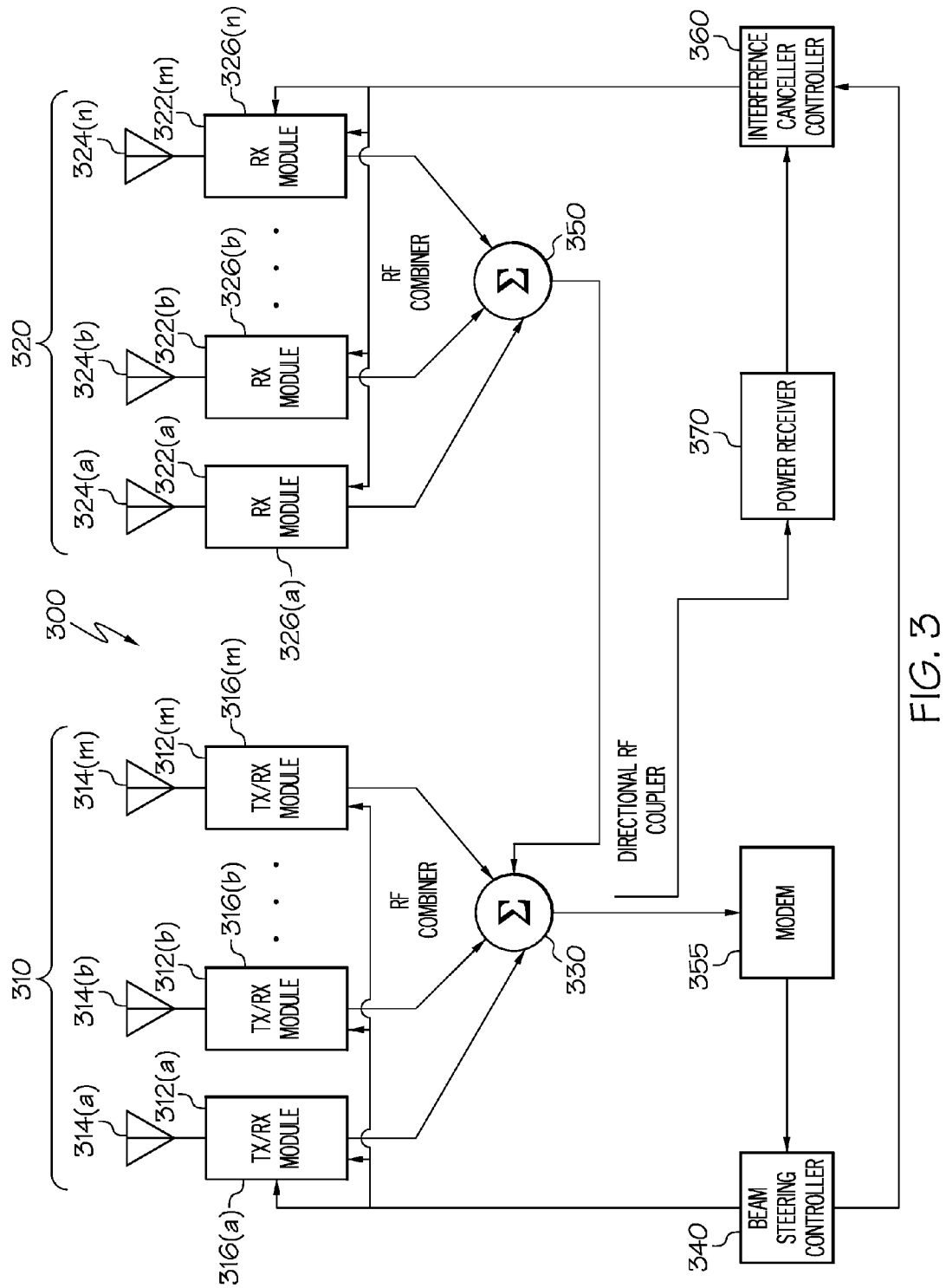
FIG. 3 is a block diagram of a system for wireless communication configured to provide interference mitigation.

With reference to FIG. 3, a block diagram of a wireless communication terminal 300 configured to provide interference mitigation is illustrated in accordance with a non-limiting implementation of the present disclosure. A primary transmit/receive antenna array 310 includes a number of antenna elements 312(a)-(m). The antenna elements 312(a)-(m) collectively are configured to transmit and/or receive signals. The primary transmit/receive antenna array 310 may be steerable, for example, to enable one or more main beams of the primary transmit/receive antenna array 310 to be steered in directions that are favorable for transmitting and/or receiving signals. For example, if wireless communication terminal 300 is configured to communicate with one or more satellites, the primary transmit/receive antenna array 310 may be steerable to train a main beam of the primary transmit/receive antenna array 310 in directions favorable for communicating with a target satellite. In some implementations, the antenna elements 312(a)-(m) may include phase shifters that enable one or more main beams of the primary transmit/receive antenna array 310 to be steered.

In some situations, when operating in a receive mode to receive a desired signal, the primary transmit/receive antenna array 310 may receive interfering signals in its side lobe(s). For example, if the wireless communication terminal 300 is located in close physical proximity to another wireless communication terminal (not shown) that transmits signals in a similar, adjacent, neighboring, and/or overlapping frequency band to the frequency band in which the wireless communication terminal 300 receives signals, the wireless communication terminal 300 may receive signals transmitted by the other wireless communication terminal in its side lobe(s). Although the gain in the side lobe(s) may be low relative to the gain in the main beam, if the power of the interfering signal is high relative to the power of the signal desired to be received, the interfering signal received in the side lobe(s) may degrade and/or interfere with the reception of the desired signal.

An auxiliary receive antenna array 320 includes a number of auxiliary antenna elements 322(a)-(n). In certain implementations, the number of primary antenna elements 312(a)-(m) in the primary transmit/receive array 310 may be greater (even significantly greater) than the number of auxiliary antenna elements 322(a)-(n) in the auxiliary receive antenna array 320. The number of antenna elements in each antenna array 310 and 320 may vary depending on the implementation taking into account factors such as, for example, cost, gain required, device form factor, etc.

The primary antenna elements 312(a)-(m) in the primary transmit/receive antenna array 310 each may include an antenna 314(a)-(m) and a transmit/receive module 316(a)-(m). Each transmit/receive module 316(a)-(m) may include one or more band pass filters (e.g. for filtering out frequencies outside of the frequency band(s) in which the wireless communication terminal 300 is intended to receive signals), a low noise amplifier (e.g., for amplifying received signals), a transmit power amplifier (e.g., for amplifying signals to be transmitted), radio-frequency switches (e.g., for switching between transmit and receive modes) and/or a phase shifter. The primary antenna elements 312(a)-(m) of the primary transmit/receive antenna array 310 are configured to receive variants of a main signal (e.g., time and/or phase shifted variants of the main signal). The outputs of the primary antenna elements 312(a)-(m) are combined by a radio frequency (RF) combiner 330. Each of these components in the primary transmit/receive antenna array 310 may operate at RF.

BSC 340 is configured to steer a main beam of the primary transmit/receive antenna array 310 in desired directions. For example, BSC 340 may control phase shifters included in the transmit/receive modules 316(a)-316(m) to steer a main beam of the primary transmit/receive antenna array 310.

The auxiliary antenna elements 322(a)-(n) in the auxiliary receive antenna array 320 each may include an antenna 324(a)-(n) and a receive module 326(a)-326(n). Each receive module 326(a)-(n) may include one or more filters (e.g., for filtering out frequencies outside of the frequency bands in which the wireless communication terminal 300 is intended to receive signals), a low noise amplifier (e.g., for amplifying received signals), and a complex weight module for applying complex weights to received signals (e.g., to shift the amplitude and/or phase of the received signals). The auxiliary antenna elements 326(a)-326(n) of the auxiliary receive antenna array 320 are configured to receive variants of a secondary signal (e.g., time and/or phase shifted variants of the secondary signal). The outputs of the auxiliary antenna elements 326(a)-326(n) are combined by an RF combiner 350. Similar to the components of the primary transmit/receive antenna array 310, each of these components of the auxiliary receive antenna array 320 may also operate at RF.

In certain implementations, the auxiliary receive antenna array 320 may be configured to sample an interfering signal. For example, the auxiliary receive antenna array 320 may be configured to sample an interfering signal transmitted by another wireless communication terminal located in close physical proximity to wireless communication terminal 300 that also may be received in the side lobe(s) of the primary transmit/receive antenna array 310. In such cases, the output of RF combiner 350, represents a model of the interfering signal received in the side lobe(s) of the primary transmit/receive antenna array 310 and can be subtracted from the main signal received by the primary transmit/receive antenna array 310 by RF combiner 330 to cancel or mitigate interference in the signal received by the primary transmit/receive antenna array 310. This subtraction may occur at RF. The signal output from RF combiner 330 may be transmitted to modem 355 for further processing by the wireless communication terminal 300. In some implementations, the signal output from RF combiner 330 may be converted to an intermediate frequency (e.g., a frequency lower than RF frequencies) before being transmitted to modem 355.

In certain implementations, ICC 360 controls the complex weights applied to the variants of the secondary signal received by the receive modules 326(a)-326(n) of the auxiliary receive antenna array 320, for example, to minimize (or mitigate) the interference in the signal output by RF combiner 330. The ICC 360 may adjust the complex weights according to an algorithm. For example, power receiver 370 may measure the power in the signal output by RF combiner 330, and the algorithm may be configured to adjust the complex weights applied by the receive modules 326(a)-326(n) to minimize the power measured in the signal output by RF combiner 330. In certain implementations, the power receiver may be implemented as a tuned power meter. Additionally or alternatively, the power receiver may include a power detector that measures power in the bandwidth of the wireless communication terminal 300 at one or more frequencies to which the power detector is tuned.

In certain implementations, BSC 340 may be configured to steer a main beam of primary transmit/receive antenna array 310 to a predetermined number of different positions, and corresponding sets of complex weights to be applied by the receive modules 326(a)-326(n) may be determined for each of the predetermined positions of the main beam of primary transmit/receive antenna array 310. These complex weights may be determined during a calibration process for wireless communication terminal 300. The calibration process may be conducted while an interfering signal is known to be present. For example, while another wireless communication terminal located in close physical proximity to wireless communication terminal 300 is transmitting, BSC 340 may steer a main beam of primary transmit/receive antenna array 310 to each of the predetermined different positions, and, for each position of the main beam of the primary transmit/receive antenna array 310, appropriate complex weights to be applied by receive modules 326(a)-326(n) may be determined to minimize the power in the signal output by RF combiner 330. These complex weights then may be stored by ICC 360 (e.g., in a table or similar data structure). Then, when wireless communication terminal 300 is operating in the receive mode, the BSC 340 may communicate an indication of the current position of a main beam of the primary transmit/receive antenna array 310 to ICC 360, and ICC 360 may set the appropriate complex weights to be applied by the receive modules 326(a)-(n) based on the current position of the main beam of the primary transmit/receive antenna array 310 as determined during the calibration process.

Additionally or alternatively, ICC 360 continually may update the weights to be applied by receive modules 326(a)-(n) in an effort to continually minimize the power in the signal output by RF combiner 330 as measured by power receiver 370. In such implementations, BSC 340 may be configured to steer a main beam of primary transmit/receive antenna array 310 to a predetermined number of different positions or, alternatively, the different positions to which BSC 340 can steer the main beam of primary transmit/receive antenna array 310 may not be predetermined. For example, BSC 340 may continually adjust the phase shifts to be applied by transmit/receive modules 312(a)-312(m) to steer the main beam of primary transmit/receive antenna array 310 to different positions perceived as favorable for transmitting a signal to and/or receiving a signal from one or more desired targets (e.g., satellites orbiting the earth).

In some implementations, wireless communications terminal 300 may be configured to receive a desired signal from two or more satellites orbiting the earth. In such implementations, primary transmit/receive antenna array 310 may be configured to produce multiple different main beams, each of which may be steered independently from the other(s). For example, primary transmit/receive antenna array 310 may be configured to produce a handoff beam and a traffic beam. The handoff beam continually may be scanned to identify and locate one or more satellites with which the wireless communication terminal 300 can communicate at a given time. If multiple satellites are available for communication with the wireless communication terminal 300, a preferred satellite for the wireless communication terminal 300 to communicate with may be determined based on, for example, signals received from the different satellites in the handoff beam. Meanwhile, the traffic beam may handle actual traffic (e.g., voice or data) and, when multiple satellites are available for wireless communication terminal 300 to communicate with, may be steered to positions perceived as being favorable for communicating with the preferred satellite. In such implementations, modem 355 may have two input ports, one for signals received in the handoff beam and the other for signals received in the traffic beam.

Furthermore, in some implementations, auxiliary receive antenna array 320 also may be configured to produce multiple different main beams that can be steered independently of each other, for example, a handoff beam and a traffic beam. In such implementations, the signal received in the handoff beam of auxiliary antenna array 320 may be used to mitigate interference in the signal received in the handoff beam of the primary transmit/receive antenna array 310 and the signal received in the traffic beam of auxiliary receive antenna array 320 may be used to mitigate interference in the signal received in the traffic beam of the primary transmit/receive antenna array 310, for example, according to the interference mitigation techniques described herein (e.g., by coordinating the steering of the beams of the primary transmit/receive antenna array 310 and the auxiliary receive antenna array 320.

In certain scenarios, steering a main beam of primary transmit/receive antenna array 310 to track a particular satellite may result in steering the main beam of primary transmit/receive antenna array 310 in a direction that causes the interfering signal to be received in the main beam of primary transmit/receive antenna array 310. In such scenarios, the auxiliary receive antenna array 320 may not be effective in mitigating interference in the primary transmit/receive antenna array 310. Thus, if wireless communication terminal 300 determines that steering a main beam of primary transmit/receive antenna array 310 to track a particular satellite will result in the interfering signal being received in the main beam of primary transmit/receive antenna array 310, wireless communication terminal 300 instead may steer the main beam of primary transmit/receive antenna array 310 to initiate communications with a different satellite.

In certain alternative implementations, the model of the interfering signal may be subtracted from the main signal at an intermediate frequency (e.g., a frequency that is lower than RF frequencies) instead of at RF. For example, in such implementations, the transmit/receive modules 316($a$)-($m$) may include circuitry (e.g., including a local oscillator) that converts the variants of the main signal received at RF to an intermediate frequency. After converting the variants of the main signal to the intermediate frequency, the transmit/receive modules 316($a$)-316($m$) also may filter (e.g., using a bandpass filter) and/or amplify (e.g., using a low noise amplifier) the received signals. The intermediate frequency signals output by the transmit/receive modules 316($a$)-($m$) then may be transmitted to combiner 330 where they are combined at the intermediate frequency instead of at RF. Alternatively, in some implementations, the signals output by transmit/receive modules 316($a$)-($m$) may be output at RF and combined into an RF main signal that is converted to the intermediate frequency before being transmitted to combiner 330. The receive modules 326($a$)-326($n$) of the auxiliary receive antenna array 320 also may convert the variants of the secondary signal that they receive from RF to the intermediate frequency before the signals are combined by combiner 350. The resulting intermediate frequency model of the interfering signal then may be subtracted from the intermediate frequency main signal by combiner 330. Alternatively, the variants of the secondary signal received by antenna elements 324($a$)-($n$) may be combined at RF by combiner 350, and the combined signal then may be converted to the intermediate frequency before being subtracted from the main signal by combiner 330. In such alternative implementations, the complex weights applied to the variants of the secondary signal by the receive modules 326($a$)-($n$) may be determined to minimize the power measured in the signal that results from subtracting the intermediate frequency model of the interfering signal from the intermediate frequency main signal.

In still other alternative implementations, the variants of the main signal received by the primary antenna elements 312($a$)-($m$) may be converted to digital baseband before being combined. Similarly, the model of the interfering signal received in the side lobe(s) of the primary transmit/receive antenna array 310 also may be converted to digital baseband before being subtracted from the main signal. For example, in such implementations, the signals output by transmit/receive modules 316($a$)-($m$) (e.g., at RF or an intermediate frequency) may be converted to digital baseband (e.g., by modems or demodulators) before being combined into a digital baseband main signal. Alternatively, the signals output by transmit/receive modules 316($a$)-($m$) may be combined to generate a main signal (e.g., an RF or intermediate frequency main signal) that then is converted to a digital baseband main signal (e.g., by a modem or a demodulator). Similarly, the signals output by receive modules 326($a$)-326($n$) (e.g., at RF or an intermediate frequency) may be converted to digital baseband (e.g., by modems or demodulators) before being combined to generate a digital baseband model of the interfering signal that then may be subtracted from the digital baseband main signal. Alternatively, the signals output by receive modules 326($a$)-($n$) may be combined by combiner 350 to generate a model of the interfering signal that then is converted to digital baseband (e.g., by a modem or demodulator) and subtracted from the digital baseband main signal. In such alternative implementations, the complex weights applied to the variants of the secondary signal by the receive modules 326($a$)-($n$) may be determined to minimize the power measured in the signal that results from subtracting the digital baseband model of the interfering signal from the digital baseband main signal.

Application of the teachings of the present disclosure may enable the simultaneous operation of two or more wireless communication terminals located in close physical proximity to one another even if the wireless communication terminals transmit and/or receive using similar, adjacent, neighboring, and/or overlapping frequencies. For example, application of the teachings of the present disclosure may enable an IRIDIUM® satellite communication terminal to be operated in the presence of a nearby active INMARSAT® satellite communication terminal.

Aspects of the present disclosure may be implemented entirely in hardware, entirely in software (including firmware, resident software, micro-code, etc.) or in combinations of software and hardware that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of such a computer-readable storage medium include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF signals, etc., or any suitable combination of the foregoing.

Computer program code for carrying out operations for aspects of the present disclosure may be written in any combination of one or more programming languages, including object oriented programming languages, dynamic programming languages, and/or procedural programming languages.

The flowchart and block diagrams in the figures illustrate examples of the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The interference mitigation techniques described herein may be employed in a wide variety of different contexts to enable concurrent operation of two or more co-located wireless communication terminals. For example, the interference mitigation techniques described herein may be employed to enable concurrent operation of two satellite communication terminals mounted within a short distance of one another on a ship or aircraft. Similarly, the interference mitigation techniques described herein may be employed to enable concurrent operation of two terminals (e.g., transceivers) on a single satellite.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to explain the principles of the disclosure and the practical application, and to enable others of ordinary skill in the art to understand the disclosure with various modifications as are suited to the particular use contemplated.

What is claimed is:

1. A satellite communication terminal for transmitting signals to and receiving signals from one or more satellites orbiting the earth, the satellite communication terminal comprising:
    a steerable primary antenna that includes an array of a first number of primary antenna elements, each primary antenna element having a band pass filter configured to pass frequencies of a signal received by the primary antenna element that are within a desired frequency band while attenuating frequencies that are outside of the desired frequency band, a low noise amplifier configured to amplify a signal received by the primary antenna element, a power amplifier configured to amplify a signal to be transmitted by the primary antenna element, a switch configured to switch the primary antenna element between operating in a transmit mode and a receive mode, and a phase shifter configured to apply weights to signals transmitted and received by the primary antenna element;
    an auxiliary antenna having an array of a second number of auxiliary antenna elements that is less than the first number of antenna elements and a receive gain that is less than a receive gain of the steerable primary antenna, each auxiliary antenna element having a phase shifter configured to apply weights to signals received by the auxiliary antenna element;
    one or more controllers configured to:
        control the weights applied by the phase shifters of the primary antenna elements to steer a main beam of the primary antenna to facilitate transmitting signals to and receiving signals from the one or more satellites, and
        control the weights applied by the phase shifters of the auxiliary antenna elements in a coordinated fashion with the weights applied by the phase shifters of the primary antenna elements to facilitate reception by the auxiliary antenna of interference that also is received in a side lobe of the antenna pattern of the steerable primary antenna, the interference being caused by transmissions from a transmitter transmitting signals to a different satellite, and being higher power than the signals to be received by the satellite communication terminal from the one or more satellites; and
    one or more signal combiners configured to combine output from the primary antenna elements of the steerable primary antenna and the auxiliary antenna elements of the auxiliary antenna to generate an interference-adjusted received signal.

2. A wireless communication system for communicating with two different wireless communication services, the wireless communication system comprising:
    a first wireless communication terminal configured to operate with a first wireless communication service and having a wireless transmitter configured to wirelessly transmit signals for the first wireless communication service; and
    a second wireless communication terminal configured to operate with a second wireless communication service that is different from the first wireless communication service and having:
        a primary antenna that has an antenna pattern with a side lobe that is subject to potential interference caused by transmissions by the wireless transmitter of the first wireless communication terminal and that is configured to transmit and receive signals for the second wireless communication service, signals to be received by the primary antenna for the second wireless communication service being lower power than the interference at the primary antenna caused by transmissions by the wireless transmitter of the first wireless communication terminal for the first wireless communication service, an auxiliary antenna configured to receive interference caused by transmissions by the transmitter of the first wireless communication terminal and generate a model of the received interference, and a signal combiner configured to subtract the model of the received interference from a received signal output by the primary antenna to generate a modified received signal.

3. A wireless communication terminal comprising:

a primary antenna apparatus that has an antenna pattern with at least a main beam and a side lobe and that is configured to:

transmit and receive signals, and generate output signals based on received signals;

an auxiliary antenna apparatus that is configured to:

enable reception of interference that also is received in the side lobe of the primary antenna apparatus and that is higher power than a desired signal intended to be received and processed by a wireless communication terminal, and generate a model of the received interference;

a signal combiner configured to combine an output signal output by the primary antenna apparatus with the model of the interference generated by the auxiliary antenna apparatus to generate an interference-adjusted received signal.

4. The wireless communication terminal of claim 3, wherein a receive gain of the auxiliary antenna apparatus is lower than a receive gain of the primary antenna apparatus.

5. The wireless communication terminal of claim 3, wherein:

the primary antenna apparatus is configured to receive radio frequency signals and generate radio frequency output signals based on the received radio frequency signals;

the auxiliary antenna apparatus is configured to receive radio frequency interference and generate a radio frequency model of the received interference; and the signal combiner is configured to combine a radio frequency output signal output by the primary antenna apparatus with the radio frequency model of the interference to generate the interference-adjusted received signal.

6. The wireless communication terminal of claim 3, wherein:

the primary antenna apparatus is configured to receive radio frequency signals and generate intermediate frequency output signals based on the received radio frequency signals;

the auxiliary antenna apparatus is configured to receive radio frequency interference and generate an intermediate frequency model of the received interference; and the signal combiner is configured to combine the intermediate frequency output signal output by the primary antenna apparatus with the intermediate frequency model of the interference to generate the interference-adjusted received signal.

7. The wireless communication terminal of claim 3, wherein:

the primary antenna apparatus is configured to receive radio frequency signals and generate baseband frequency output signals based on the received radio frequency signals;

the auxiliary antenna apparatus is configured to receive radio frequency interference and generate a baseband frequency model of the received interference; and the signal combiner is configured to combine the baseband frequency output signal output by the primary antenna apparatus with the baseband frequency model of the interference to generate the interference-adjusted received signal.

8. The wireless communication terminal of claim 3, wherein the primary antenna apparatus is configured to transmit signals to and receive signals from one or more satellites orbiting the earth.

9. The wireless communication terminal of claim 8, wherein the primary antenna apparatus is configured to steer the main beam to facilitate transmitting signals to and receiving signals from the one or more satellites.

10. The wireless communication terminal of claim 8, wherein the auxiliary antenna apparatus is configured to receive interference that is caused by a satellite transmitter transmitting signals to a different satellite.

11. The wireless communication terminal of claim 3, wherein:

the primary antenna apparatus is configured to receive signals within a first frequency band; and the auxiliary antenna apparatus is configured to enable reception of interference that is caused by a transmitter transmitting signals in a second frequency band that overlaps the first frequency band.

12. The wireless communication terminal of claim 3, wherein:

the primary antenna apparatus is configured to receive signals within a first frequency band; and the auxiliary antenna apparatus is configured to enable reception of interference that is caused by a transmitter transmitting signals in a second frequency band that neighbors the first frequency band.

13. The wireless communication terminal of claim 3, wherein:

the primary antenna apparatus is configured to receive signals within a first frequency band; and the auxiliary antenna apparatus is configured to enable reception of interference that is caused by a transmitter transmitting signals in a second frequency band that is adjacent to the first frequency band.

14. The wireless communication terminal of claim 3, wherein the primary antenna apparatus is configured to transmit and receive signals within the L band of the radio spectrum.

15. The wireless communication terminal of claim 3 wherein the wireless communication terminal is integrated within a satellite configured to orbit the earth.

16. The wireless communication terminal of claim 3, wherein the auxiliary antenna apparatus is configured to enable reception of interference that has a power ratio to the desired signal intended to be received and processed by the wireless communication terminal of 100 dB or more.

17. The wireless communication terminal of claim 3, wherein the primary antenna apparatus configured to transmit and receive signals includes multiple antenna elements configured to transmit and receive signals and the primary antenna apparatus is configured to generate output signals based on received signals at least in part by combining signals received by the multiple antenna elements.

18. The wireless communication terminal of claim 3, wherein the signal combiner is configured to combine the output signal output by the primary antenna apparatus with the model of the interference generated by the auxiliary antenna apparatus by subtracting the model of the interference from the output signal output by the primary antenna apparatus.

19. The wireless communication terminal of claim 3, wherein:
    the antenna pattern of the primary antenna apparatus has a main handoff beam in addition to the main beam;
    the primary antenna apparatus is further configured to:
        steer the main beam to facilitate transmitting signals to and receiving signals from selected communication apparatuses,
        steer the handoff beam to sample signals transmitted by various communication apparatuses,
        select, from among the various communication apparatuses, a new communication apparatus from which to transmit and receive signals based on interference-adjusted versions of the sampled signals transmitted by the various communication apparatuses, and
        as a consequence of selecting the new communication apparatus from and to which to transmit and receive signals, adjust the main beam to facilitate transmitting signals to and receiving signals from the new communication apparatus;
    the auxiliary antenna apparatus is configured to generate different interference models of interference interfering with the sampled signals transmitted by the various communication apparatuses; and
    the wireless communication terminal further comprises another signal combiner configured to combine the different interference models of the interference interfering with the sampled signals with the corresponding sampled signals to generate the interference-adjusted versions of the sampled signals.

20. The wireless communication terminal of claim 3, wherein the wireless communication terminal is configured to:
    steer the main beam of the antenna pattern of the primary antenna apparatus to facilitate transmitting signals to and receiving signals from a selected communication apparatus while one or more of the wireless communication terminal and the selected communication apparatus moves relative to the other;
    determine if continuing to steer the main beam to facilitate transmitting signals to and receiving signals from the selected communication apparatus will cause the main beam to be oriented in a manner that will subject the main beam to unacceptable interference from a particular interference source; and
    adjust the main beam of the antenna pattern of the primary antenna apparatus to facilitate transmitting signals to and receiving signals from a different communication apparatus as a consequence of determining that continuing to steer the main beam to facilitate transmitting signals to and receiving signals from the selected communication apparatus will cause the main beam to be oriented in a manner that will subject the main beam to unacceptable interference.

\* \* \* \* \*